United States Patent

Svensson

[15] 3,650,538
[45] Mar. 21, 1972

[54] ARRANGEMENT AT FEED COLLET

[72] Inventor: Karl Henning Svensson, 69 Stamgatan, Alvsjo, Sweden

[22] Filed: Oct. 29, 1969

[21] Appl. No.: 872,101

[30] Foreign Application Priority Data

Oct. 31, 1968 Sweden...............................14761/68

[52] U.S. Cl...................................................279/51
[51] Int. Cl....................................................B23b 31/12
[58] Field of Search ..................................279/41, 43, 46, 51

[56] References Cited

UNITED STATES PATENTS 2,695,787  11/1954  Sunnen.....................................279/46
3,411,796  11/1968  Decker.....................................279/46

Primary Examiner—Andrew R. Juhasz
Assistant Examiner—James F. Coan
Attorney—Darby & Darby

[57] ABSTRACT

In a feed collet for use in automatic machines the arrangement of a sleeve to prevent scratches in the material to be worked and rendering it possible to use one and the same feed collet for several material dimensions.

6 Claims, 6 Drawing Figures

Patented March 21, 1972
3,650,538
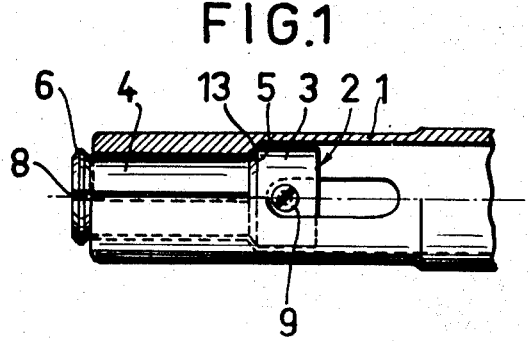
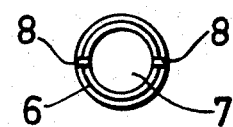
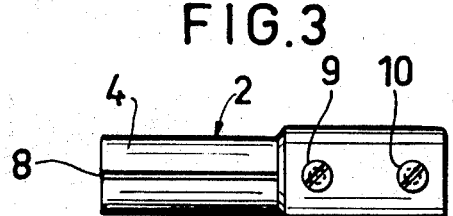
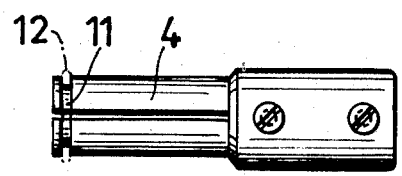
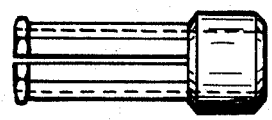
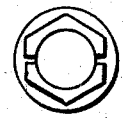
INVENTOR
KARL HENNING SVENSSON
BY *Darby & Darby*
ATTORNEYS

ARRANGEMENT AT FEED COLLET

In connection with the working of rod material in automatic machines, for example automatic lathes, the rod material during its feed at times is scratched by the feed collets. For avoiding such scratches, among other measures two sleeve halves of a comparatively soft material have been fastened by soldering directly in front of each other within a feed collet. Owing to their gradual wear, however, the sleeve halves had to be replaced by new ones, which involved time-consuming work for removing the worn sleeve halves and mounting the new ones. Moreover, for every dimension of rod material a feed collet with soldered-on sleeve halves was required.

These problems are eliminated by the arrangement according to the invention, which is characterized in that it comprises a resilient sleeve disposed within the feed collet and adapted to be clamped together, which sleeve in its active state embraces the rod material to be worked and is provided with means to prevent its motion in axial direction relative to the feed collet during the feed motion of the latter. Said arrangement is mounted easily detachable in a feed collet and allows for the use of one and the same feed collet for a plurality of rod dimensions.

The invention is described in greater detail in the following by way of some embodiments, with reference to the accompanying drawing in which FIG. 1 shows an arrangement according to the invention inserted in a feed collet, FIG. 2 shows an end view of the arrangement in Fig. 1, FIG. 3 shows another embodiment of the arrangement, FIG. 4 shows still another embodiment thereof, FIG. 5 shows an arrangement according to the invention for a hexagonal feed collet, and FIG. 6 shows an end view of the sleeve in FIG. 5.

In FIG. 1 (a portion of) a feed collet 1 of standard design is shown in which an insert sleeve 2 according to the invention is mounted. Said sleeve 2 is a rotary body provided with a narrower portion 4 of such a diameter that in inserted state of the sleeve in the collet said narrower portion abuts to the inside surface of the collet which at normal use embraces the rod material. The shoulder 5 disposed between the portions 3 and 4 prevents by striking against an inside shoulder 13 provided in the feed collet the insert sleeve from moving ahead relative to the collet at the rearward motion of the latter. The sleeve terminates forwardly in feed direction (to the left in Fig. 1) with a flange 6 of such a diameter that the sleeve can be introduced into the feed collet from behind and that the flange in inserted state of the sleeve in the collet embraces the forward edges of the collet and thereby prevents the rearward motion of the sleeve.

The sleeve 2 is provided with an axial through hole 7 of substantially the same diameter as the rod material to be worked. Two slots 8 are arranged diametrically opposed along the sleeve so as to extend through the flange 6 and the narrower portion 4 substantially to the portion 3 of greater diameter. Said slots render the sleeve adapted for being clamped together and thereby to retain a rod work-piece. Two screws 9 arranged radially in holes in the sleeve portion 3 of greater diameter and with their heads received in a longitudinal slot in the feed collet are adapted to take along the sleeve in the rotation of the feed collet.

In order to prevent rearward motion of the sleeve in the feed collet, instead of the flange 6 in the wider portion 3 of the sleeve an additional screw 10 (FIG. 3) can be provided at such a distance from the shoulder 5 that the screw-head abuts to the rear edge of the longitudinal slot.

A further possibility of preventing rearward sleeve motion is by providing its slotted narrower portion 4 with a groove 11 (FIG. 4) for a stop ring 12 or the like, said groove being so disposed that the stop ring will abut to the forward edge of the feed collet.

For its application together with a hexagonal feed collet, the insert sleeve may have the design as shown in FIGS. 5 and 6, in which case no screw or the like is required because the sleeve is taken along alone by its external shape.

The insert sleeve according to the invention is applied in the way as follows.

The sleeve is inserted into the feed collet from behind without the screws 9 (and 10 if the embodiment according to FIG. 3 is used, and without stop ring 12 if the embodiment according to FIG. 5 is used) and is driven forwards whilst the legs of the feed collet are widened and the slotted portion of the sleeve is clamped together. The sleeve having assumed its correct position, the slotted portion springs out and the flange 6 embraces the forward edge of the feed collet. At the embodiment according to FIG. 3 the screw 10 or, at the embodiment according to FIG. 5 the stop ring 12 may be attached for preventing rearward motion of the sleeve in the feed collet, respectively.

When during the feed motion the feed collet is clamped together, also the insert sleeve is clamped together so as to embrace the rod material and, thereby, take it along in feed direction. When the feed collet after completed feed releases the sleeve, the slotted sleeve portion springs out so that the sleeve together with the feed collet can be returned for a new feed motion.

One essential advantage of the arrangement is that one and the same feed collet can be used for a plurality of rod dimensions. This is achieved by utilizing a plurality of sleeves with the same outer diameter corresponding to the nominal diameter of the collet, but with different inner diameters. A 15 mm. feed collet, for example, together with a plurality of sleeves can be utilized for rod material having inner diameters between 4 and 10 mm.

The insert sleeve according to the invention preferably is made of a material, for example phosphor bronze, which is softer than the material to be worked.

I claim:

1. Arrangement at feed collet for preventing scratches in rod material in automatic lathes which comprises a resilient sleeve disposed with the feed collet comprising a forward portion having a relatively small diameter abutting the inside diameter of the corresponding feed collet portion and a rear portion having a relatively large diameter in comparison to the forward portion, the sleeve having two parallel longitudinal slots therein extending from the forward portion substantially toward the rear portion and adapted to be clamped together, a flanged stop ring on the forward portion of the sleeve, said flanged stop ring having a greater diameter than the forward portion of the sleeve and striking against the forward edge of the feed collet to prevent rearward motion of the sleeve relative to the feed collet, only the end adjacent the stop ring of the forward portion of the sleeve in its active state embraces the rod material to be worked.

2. Arrangement according to claim 1 wherein the rear portion of the sleeve includes a sleeve shoulder adapted to strike against a shoulder in the feed collet to prevent forward motion of the sleeve relative to the feed collet.

3. Arrangement according to claim 2 wherein the sleeve includes means for connecting the sleeve to rotate with the feed collet.

4. Arrangement according to claim 3, wherein the means for connecting the sleeve to rotate with the feed collet comprises at least one radially located fastening device on the rear portion of said sleeve, said fastening device adapted to be received in a corresponding longitudinal slot in the feed collet.

5. Arrangement according to claim 2 wherein the sleeve has a cross section in the form of a regular hexagon, and the feed collet has a corresponding inner cross section.

6. Arrangement according to claim 4 wherein the sleeve is comprised of a phosphor bronze which is softer than the material to be worked.

* * * * *